United States Patent [19]

Smith

[11] 4,133,922

[45] Jan. 9, 1979

[54] WREATH DEVICE

[76] Inventor: Joseph Smith, 472 N. Quincy St., Brockton, Mass. 02402

[21] Appl. No.: 801,058

[22] Filed: May 27, 1977

[51] Int. Cl.² ............................................. A47G 33/00
[52] U.S. Cl. ...................................... 428/10; 428/27
[58] Field of Search ............................ 428/10, 23, 27; 248/27.8; 206/423; 362/122; D11/117, 119, 120; 47/41.12; 93/1.5

[56] References Cited

U.S. PATENT DOCUMENTS

| | | | |
|---|---|---|---|
| 1,478,487 | 12/1923 | Ross | 428/10 |
| 1,696,221 | 12/1928 | Tubbs | 428/10 X |
| 1,960,476 | 5/1934 | Cohen | 428/10 |
| 2,323,090 | 6/1943 | Ireland | 428/10 X |
| 2,499,740 | 3/1950 | Glance | 428/10 X |
| 2,740,218 | 4/1956 | Miller | 428/10 |
| 2,849,822 | 9/1958 | Bachman | 428/10 X |
| 3,059,365 | 10/1962 | Teufel | 428/10 X |
| 3,591,442 | 7/1971 | Matesi | 428/10 |

FOREIGN PATENT DOCUMENTS

728494  4/1932  France ................................. 428/23

*Primary Examiner*—Henry P. Epstein
*Attorney, Agent, or Firm*—Wolf, Greenfield & Sacks

[57] ABSTRACT

A component to facilitate the hand fabrication of decorative wreaths comprising a flat annular member, preferably molded or vacuum formed of plastic. A plurality of integrally formed bridges extend radially from the surface of the annular member at substantially uniform distances apart. The bridges are spaced from the planar surface of the annular member to permit stems of fir twigs or picks to be inserted underneath. In use, a plurality of picks are attached to the component by sliding the stem of a twig under the cross member of a bridge with the other end of the twig overlying the next adjacent bridge. Twigs are arranged around the entire circumference of the annual member in shingle-like fashion to form a conventionally appearing decorative tree wreath.

3 Claims, 4 Drawing Figures

WREATH DEVICE

BACKGROUND OF THE INVENTION

The present invention relates to improved decorative wreath construction, a component thereof and a method of making decorative wreaths.

Heretofore, decorative wreaths of a conventional annular shape have been made of natural evergreen sprigs or, more recently, have been made entirely of molded plastic. Quality decorative tree wreaths of evergreen are ordinarily made by attaching evergreen sprigs or picks (as they are known in the trade) to a wire frame. Each sprig is individually sewed by wire or string to the frame until the wreath is completed. This process is expensive and time consuming, since it takes in the order of fifteen minutes or more to make a wreath of approximately a foot and a half in diameter. Less expensive wreaths are also made with evergreens by sticking the sprigs to a flat ring formed of styrofoam. This system is less expensive but the resultant product is not ordinarily well made. Another system involves sticking the sprigs in a ring of straw. While this arrangement is more permanent it is quite expensive. As a consequence of the deficiencies of these methods, hand-made Christmas or other decorative wreaths of natural evergreen have largely been supplanted by wreaths made entirely of plastic. Plastic decorative tree wreaths, however, are esthetically less than desirable. Consequently, there is still a significant demand for moderately priced decorative tree wreaths made of natural evergreen products.

SUMMARY OF THE INVENTION

It is an object of the present invention to provide an improved means and method of making decorative tree wreaths using natural evergreen products.

A further object of the present invention is to provide an improved method of assembling natural evergreen twigs into a decorative wreath on a simple component base without the need of individually tying each twig to the base. One further object of the present invention is to provide an improved component or base for attachment of twigs or picks to form a Christmas wreath.

In the present invention there is provided an improved component or base integrally formed and adapted to be made by vacuum forming plastic sheets or by injection molding. The component consists of an annular member with a flat planar-like surface. A plurality of radially arranged retaining members, each having a bridge-like shape, are interconnected to the surface of the annular member. In a preferred embodiment, the bridge member is provided with an intermediate leg.

In use, a plurality of evergreen twigs or picks, each having fir leaves and a stem are secured to the annular member by slipping the stem end of the twig under a retaining member, with the other end of the twig extending over the next adjacent radially arranged retaining member. A plurality of twigs can be secured to each retaining member. The twigs are successively arranged about the radius of the annular member to form a shingle-like effect with twigs secured under one retaining member overlapping the stem ends of twigs secured to the next adjacent retaining member.

The invention also provides an improved means and method of making the component, in a plurality of annular members of different sizes as well as a center piece component.

BRIEF DESCRIPTION OF DRAWINGS

The foregoing objects and advantages may be best understood in connection with the accompanying drawings in which.

BRIEF DESCRIPTION OF THE INVENTION

Figure 1:
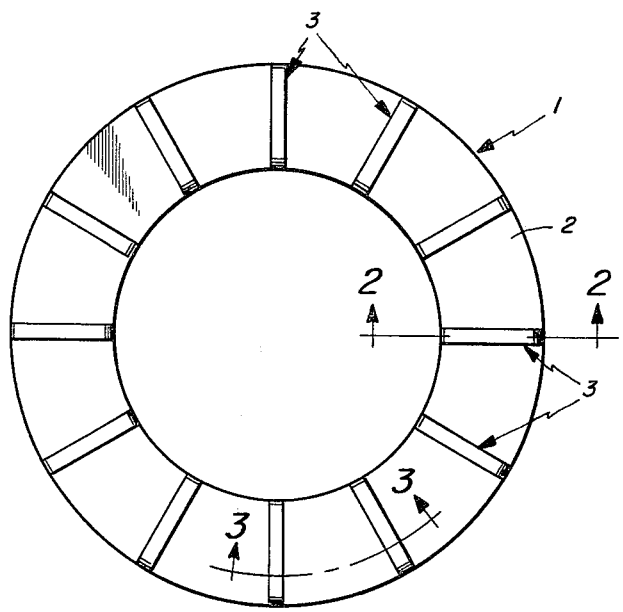
FIG. 1 is a plan view of a component embodying the invention.
Figures 2, 3:
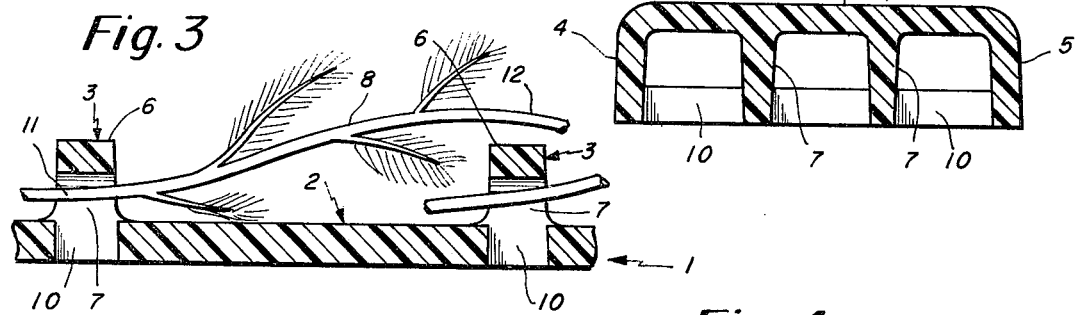
FIG. 2 is a cross section taken along the line 2—2 of FIG. 1 but on an enlarged scale.
FIG. 3 is fragmentary cross section taken along the line 3—3 of FIG. 1, but on an enlarged scale and showing fir sprigs secured on the component in accordance with the invention.

Referring to the drawings, there is illustrated a decorative wreath type ornamentation component 1 designed especially for use in hand crafting Christmas wreaths. The component 1 consists essentially of an annular member having a flat planar-like major surface 2. A plurality of radially arranged retaining members 3 are each formed with opposite legs 4 and 5 and an interconnecting bight 6. In a preferred embodiment, the interconnecting bight 6 is also provided with one or more intermediate legs 7. The free ends of legs 4 and 5 engage the planar surface 2. In the arrangement the bights extend generally radially from the center of the annular member. The retaining members are preferably formed a sufficient distance apart such as to permit evergreen twigs 8 interengaged with one retaining member to overlap at least and preferably more than one adjacent retaining member in a manner as hereafter described.

The bights 6 of the retaining members 3 are spaced approximately one-half inch from the planar surface 2 and preferably have a length which is substantially the entire width of the annular member. In an annular member typically having a diameter of eighteen inches, the width of the planar-like surface is approximately three inches. Each retaining member 3 is approximately two and a half inches in length with the height of the bight portion from the retaining member in the order of one-half inch.

The annular member may be provided with a series of holes 10 to make the annular member lighter in weight and to economize in its fabrication.

In assembling Christmas wreaths using the annular member 1, illustrated in the drawings, a plurality of fir or other evergreen twigs 8 are each arranged with stems 11 inserted under and frictionally engaging a radially arranged retaining member 3. A plurality of twigs are inserted under each retaining member 3. A shingling effect, conventional in Christmas wreath ornaments of this type, is effected by inserting the fir twigs 8 around the entire surface of the annular member with the needles extending over the sides to hide the surface 2. None of the twigs need be secured by wire or string. Therefore, once the stem of each twig is inserted underneath a retaining member, it will remain in place.

Figure 4:
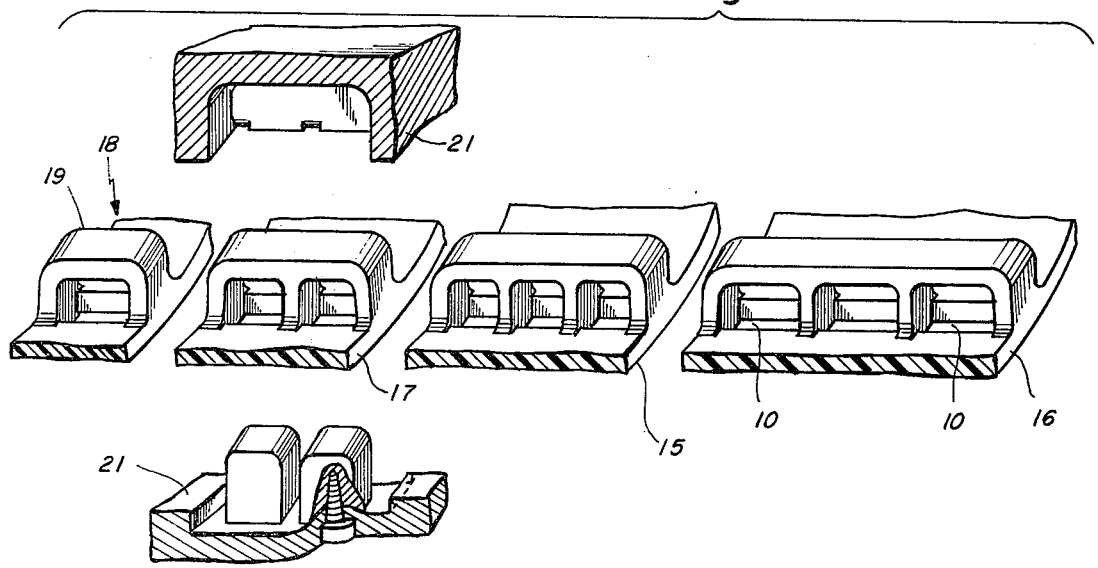
FIG. 4 is fragmentary cross sectional view of a plurality of components including a centerpiece to illustrate a means and method of simultaneous manufacture of components of different sizes.

FIG. 4 illustrates a means and method of fabricating a plurality of retaining members simultaneously. A plurality of retaining members 15 and 16 are similar to those previously described. The outer diameter of member 15 is equal to the inner diameter of member 16, thus permitting the two members to be concentrically and simultaneously molded.

A center piece 17 concentric with the smaller member 15 has an outer diameter equal to the inner diameter of member 15. It is similar in arrangement to the member 15 except for size and may therefore be used to make either very small wreaths or center pieces in a manner similar to the method previously described. A center element 18 having a leg and bright arrangement 19 may be used to secure several sprigs arranged radially to form the base of a candle.

The assembly of elements illustrated in FIG. 4 may be simultaneously molded in a single injection mold, schematically illustrated at 20, 21 which is formed and arranged by known means to simultaneously mold the components as illustrated.

While the foregoing specification is described particularly with respect to making Christmas wreaths, the invention has general applications for decorative wreaths in general, and the description should be accordingly construed.

What is claimed is:

1. A decorative wreath-type ornamentation component comprising an annular member with a flat planar-like surface, a plurality of radially arranged retaining members each formed with a pair of legs with one extending angularly from each end of an interconnecting bight, the ends of said legs remote from said bight engaging the outer periphery of said surface said bights extending generally radially from the center of said annular member, and spaced along their center lengths from said surface and means forming a plurality of radially arranged openings in said member intermediate said legs said retaining members adapted to retain the ends of sprigs of fir trees with the other ends overlying the bights of adjacent retaining members.

2. A decorative wreath-type ornamentation component as set forth in claim 1 wherein said bight is parallel to and is spaced approximately ½ inch from said surface.

3. A decorative wreath-type ornamentation component as set forth in claim 2 including means interconnecting said retaining member and said surface intermediate said legs.

* * * * *